United States Patent [19]
Luecke et al.

[11] Patent Number: 5,416,757
[45] Date of Patent: May 16, 1995

[54] OPTICAL DISK DRIVE SYSTEM FOR USE WITH DISKS HAVING DIFFERENT PROTECTION LAYER DEPTHS

[75] Inventors: Frank Luecke; James M. Zavislan, both of San Jose, Calif.

[73] Assignee: International Business Machines Corporation, Armonk, N.Y.

[21] Appl. No.: 245,881

[22] Filed: May 18, 1994

Related U.S. Application Data

[63] Continuation of Ser. No. 75,849, Jun. 11, 1993, abandoned, which is a continuation of Ser. No. 777,019, Oct. 16, 1991, abandoned.

[51] Int. Cl.$^6$ .......................... G11B 7/00; G01D 1/20
[52] U.S. Cl. ....................... 369/44.23; 369/44.14; 369/112; 250/201.5; 359/75
[58] Field of Search ............... 369/44.11, 44.14, 44.23, 369/44.24, 112, 94, 93, 95, 44.21, 117; 359/75, 87, 95, 82, 37, 53, 41, 42, 70, 49, 51, 55, 83; 250/201.5, 201.9

[56] References Cited

U.S. PATENT DOCUMENTS

| | | | |
|---|---|---|---|
| 4,001,493 | 1/1977 | Cone | 369/95 |
| 4,037,929 | 7/1977 | Bricot et al. | 369/44.23 |
| 4,124,273 | 11/1978 | Huignard et al. | 369/44.23 |
| 4,182,553 | 1/1980 | Sheridon | 359/87 |

(List continued on next page.)

FOREIGN PATENT DOCUMENTS

| | | | |
|---|---|---|---|
| 0334340 | 9/1989 | European Pat. Off. | |
| 0414380 | 7/1990 | European Pat. Off. | |
| 0446949 | 3/1991 | European Pat. Off. | |
| 52-153705 | 12/1977 | Japan | |
| 58-26332 | 2/1983 | Japan | 369/44.11 |
| 59-52437 | 3/1984 | Japan | 369/44.24 |
| 60-202545 | 3/1986 | Japan | |
| 62-66433 | 8/1987 | Japan | |
| 62-209412 | 3/1988 | Japan | |
| 62-234118 | 4/1988 | Japan | |
| 63-113522 | 5/1988 | Japan | 359/75 |
| 246423 | 8/1988 | Japan | |
| 1163712 | 9/1989 | Japan | |
| 2-94131 | 4/1990 | Japan | 369/44.23 |

OTHER PUBLICATIONS

IBM Technical Disclosure Bulletin vol. 24, No. 4, Sep. 1981.

IBM Technical Disclosure Bulletin vol. 31, No. 12, May 1989.

"Liquid–crystal laser optics: design, fabrication, and performance", J. Optical Soc. Am. B/vol. 5, No. 9/Sep. 1988.

"New Jobs for Liquid Crystals" by Herbert Kaplan Photonics Spectra, Apr. 1990, pp. 82 & 84.

Liquid Crystal Cells with Special Electrodes for the Generation of Uniform Colors by Optical Birefringence (by Chabicovsky et al Oct. 12, 1976 pp. 61–63).

*Primary Examiner*—Georgia Y. Epps
*Assistant Examiner*—Nabil Hindi
*Attorney, Agent, or Firm*—Baker, Maxham, Jester & Meador

[57] ABSTRACT

The objective lens of an optical disk drive has a suitable positioning and numerical aperture so that the light beam will be focused into a spot on the optical media of a first optical disk having a cover plate with a first thickness. When a second optical disk is utilized having a cover plate with a second thickness different from the first thickness, a liquid crystal compensator lens is actuated in the optical path between the light source and the objective lens for focusing the light beam into a spot on the optical media of the second optical disk. A correction signal may be applied to the liquid crystal in the compensator lens for altering a refractive index thereof. This substantially eliminates a wavefront aberration in the reflected light beam which would otherwise occur if the beam were focused onto the optical media of the second optical disk solely by use of the objective lens. The lower alignment film of the liquid crystal compensator lens has a cross-section which is approximately sinusoidal in order to complement three waves of aberration (measured from peak-to-valley) in the reflected wavefront.

34 Claims, 2 Drawing Sheets

U.S. PATENT DOCUMENTS

| | | | |
|---|---|---|---|
| 4,431,272 | 2/1984 | Yazawa et al. | 359/87 |
| 4,456,336 | 6/1984 | Chung et al. | 359/87 |
| 4,729,640 | 3/1988 | Sakata | 359/95 |
| 4,737,946 | 4/1988 | Yamashita et al. | 369/44.12 |
| 4,781,440 | 11/1988 | Toda | 359/51 |
| 4,791,625 | 12/1988 | Nakamura | 369/44.23 |
| 4,832,456 | 5/1989 | Yamazaki et al. | 359/82 |
| 4,861,143 | 8/1989 | Yamazaki et al. | 359/87 |
| 4,904,060 | 2/1990 | Grupp | 359/87 |
| 4,927,241 | 5/1990 | Kuijk | 359/51 |
| 4,991,940 | 2/1991 | Dalisa et al. | 359/70 |
| 5,058,091 | 10/1991 | Murao et al. | 369/112 |
| 5,071,229 | 12/1991 | Oaki et al. | 359/53 |
| 5,097,464 | 3/1992 | Nishiuchi et al. | 369/44.24 |
| 5,202,875 | 4/1993 | Rosen et al. | 369/94 |
| 5,220,444 | 6/1993 | Mitsui et al. | 359/87 |

WAVEFRONT ERROR VS. NORMALIZED PUPIL COORDINATES

OPTICAL DISK DRIVE SYSTEM FOR USE WITH DISKS HAVING DIFFERENT PROTECTION LAYER DEPTHS

This application is a continuation of application No. 08/075,849, filed Jun. 11, 1993, now abandoned, which was a continuation of application No. 07/777,019, filed Oct. 16, 1991, now abandoned.

BACKGROUND OF THE INVENTION

The present invention relates to the field of optical data storage, and more particularly, to optical disk drive systems in which the disk has a thin transparent layer that protects the recording surface from scratches and contamination.

Optical disk drive systems are widely used in audio, video and computer-related applications. Typically a laser beam is modulated by a pulse signal from an information source in order to record the information in binary form on the surface of the disk made of the special media. In a write-once-read-mostly (WORM) optical disk drive system the drive can write information onto the disk which cannot later be re-written. Small regions of the disk media which are arranged in concentric or spiral tracks are physically altered by the laser beam, such as by heating. The information recorded can be read by reflecting a laser beam off the surface at a low power so as not to physically alter the small regions. The disk may be impressed with radial servo-tracking information, data-synchronization signals and pre-formatting to provide positioning information for the optical head. CD ROM drives are similar to WORM drives except that the former can only read pre-recorded optical media. They have no capability for writing. More recently, developed erasable optical disk drive systems have been developed. They permit information to be temporarily written on the disk media and either erased or written over. Such systems require magneto-optic (MO) media and rely upon the so-called Kerr effect. When light is reflected from a film of magnetized magneto-optic material the light has its plane of polarization rotated.

Optical disks which have come into wide spread use have typically included a transparent protective layer or so-called cover plate to protect the recording surface of the underlying optical media from scratches and contamination. Glass or plastic are commonly used as the cover plate. One standard thickness of the cover plate is 1.2 mm. Surface defects or contamination on the cover plate do not normally introduce errors because they are not in the focal plane of the objective lens in the optical head. The objective lens is typically designed to correct the spherical aberration induced by the 1.2 mm cover plate.

Currently, objective lenses utilized in commercially available optical disk drive systems have a 0.55 numerical aperture and are corrected for a 1.2 mm cover plate thickness. In the future, the numerical aperture will be increased to increase the data storage density. As the numerical aperture increases, the tolerances on disk tilt are correspondingly reduced. For example, the increasing of the numerical aperture from 0.55 to 0.65 requires the disk tilt tolerance to be reduced by a factor of 1.65. However, the disk tilt tolerances are also proportional to the thickness of the optical disk. Thus, if the thickness of the disk cover plate could be reduced from 1.2 mm to, for example, 0.6 mm, the disk tolerances could remain as specified in the current industry specification or even be relaxed by 15%.

Designing an objective lens in an optical head to work with a 0.6 mm cover plate would prevent it from reading or writing with respect to an optical disk having a 1.2 mm cover plate. This is because of the uncorrected spherical aberration resulting from the 0.6 mm uncompensated portion of the cover plate thickness. FIG. 1 illustrates the wavefront aberrations introduced by focusing a laser beam corrected for a 0.6 mm cover plate through a 1.2 mm cover plate utilizing a 0.65 numerical aperture objective lens. The wavefront has approximately three waves of aberration measured from peak-to-valley. The vertical axis represents units of optical wavefront error in wavelengths of 830 nanometers. The horizontal axis represents normalized pupil coordinates.

It is possible to mechanically insert a glass plate into the path of the laser beam when interchanging optical disks having different cover plate depths. In other words, the optical disk drive system can incorporate an objective lens designed for a thick cover plate. The same optical disk drive system can then operate with optical disks having a thinner cover plate by physically adding the equivalent of a second cover plate to make up the missing cover plate depth. However, such a solution is unsatisfactory because the electro-mechanical devices which are necessary are not compatible with reproducible (tilt-free) insertion and long-term reliability of the system. Also, this method would be too slow and mechanically complex for cascaded systems designed to read data stored on multiple layers of a disk.

SUMMARY OF THE INVENTION

Accordingly, it is the primary object of the present invention to provide an optical disk drive system which permits interchangeable use of optical disks having different cover plate depths.

According to the illustrated embodiment of our invention, a mechanism is provided for rotating an optical disk about a drive axis. A light beam from a source is focused into a spot on an underlying optical media of the disk. Light reflected from the optical media is received by a photo-detector and information encoded on the media is recovered therefrom. The objective lens has a suitable positioning and numerical aperture so that the light beam will be focused into a spot on the optical media of a first optical disk having a cover plate with a first thickness. When a second optical disk is utilized having a cover plate with a second thickness different from the first thickness, a compensator lens is actuated in the optical path between the light source and the objective lens for focusing the light beam into a spot on the optical media of the second optical disk. The compensator lens may comprise a laminated structure of transparent substrates, liquid crystal alignment films and electrodes which enclose a quantity of liquid crystal material. A correction signal may be applied to the liquid crystal material for altering a refractive index thereof. This substantially eliminates a wavefront aberration in the reflected light beam which would otherwise occur if the beam were focused onto the optical media of the second optical disk solely by use of the objective lens. The lower substrate, alignment film and electrode have a cross-section which is approximately sinusoidal in order to complement three waves of aberration (measured from peak to valley) in the reflected wavefront.

DESCRIPTION OF THE PREFERRED EMBODIMENT

Figure 2:
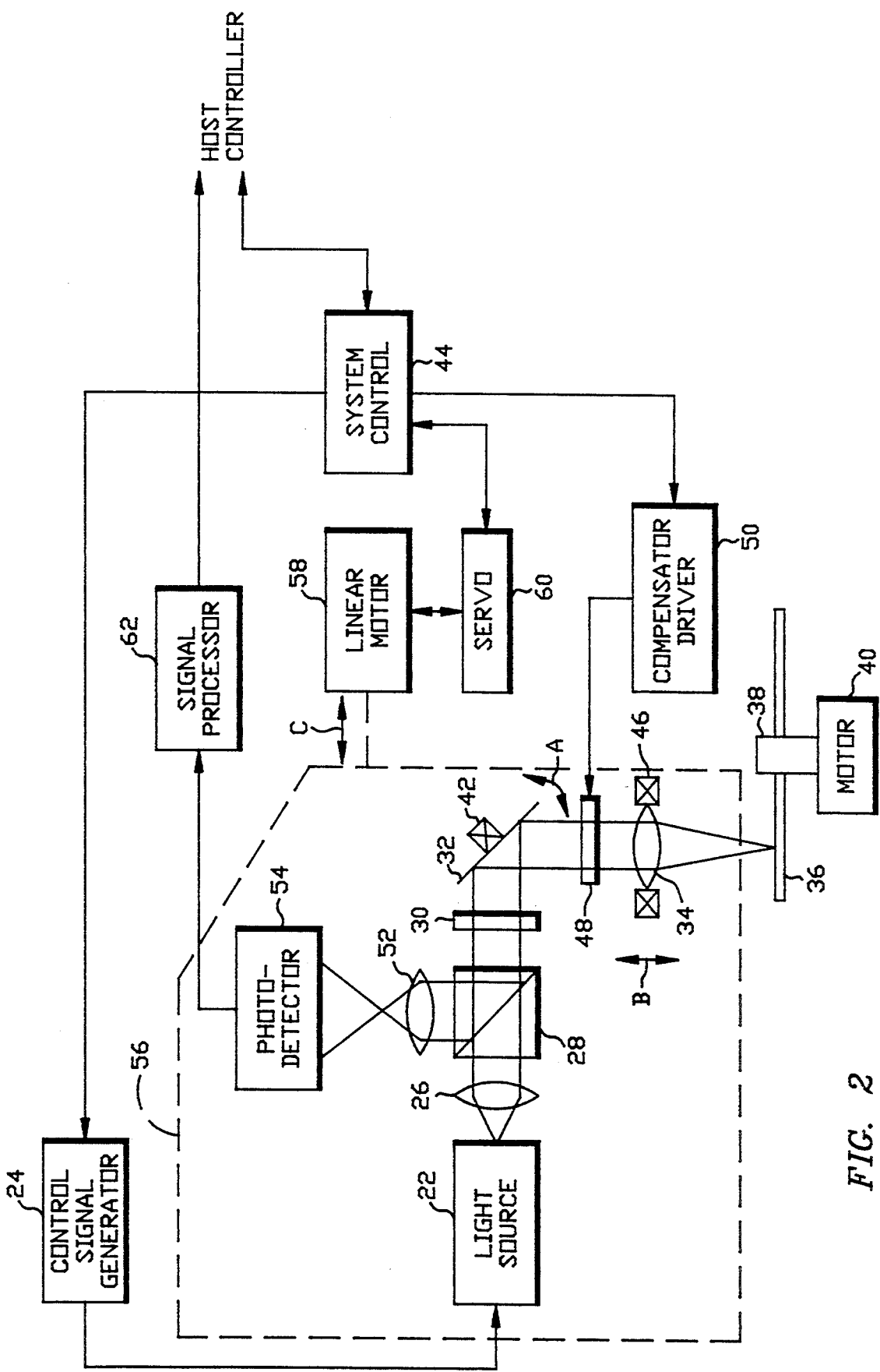
FIG. 2 is a combination diagrammatic view and functional block diagram of a preferred embodiment of our optical disk drive system.

Referring to FIG. 2, a light source 22 such as a laser is energized by a control signal generator 24. The light beam from the light source 22 is transmitted through a lens 26, a beam splitting prism 28, and a quarter-wave plate 30 to a galvano-mirror 32. The light beam is reflected by the galvano-mirror 32 and focused by an objective lens 34 onto an optical disk 36. The optical disk 36 is supported by a spindle 38 connected to a motor 40 for rotating the disk about a drive axis perpendicular to the plane of the disk. The galvano-mirror 32 is pivotally mounted and moveable through an angle illustrated by the double arrow labeled A in FIG. 2. This movement of the galvano-mirror is accomplished via solenoid 42 to move the light beam in a radial direction on the disk in order to follow an information track encoded thereon. The solenoid 42 is driven by a servo circuit (not illustrated) connected to a system control 44.

The objective lens 34 is moved toward and away from the disk 36 as illustrated by the double arrow labeled B in FIG. 2. This movement of the objective lens along an axis perpendicular to a plane of the disk 36 is accomplished by means of a solenoid 46 energized by another servo circuit (not illustrated) connected to the system control 44.

The optical disk 36 comprises a conventional underlying optical media and an overlying cover plate of either plastic or glass having a thickness of, for example, 0.6 mm. The objective lens 34 is moved toward and away from the optical disk 36 in order to focus the light beam into a spot on the optical media. Information is encoded on the media in binary form in concentric tracks or in a spiral track. In one conventional form of optical media, the data is encoded as a succession of pits and islands which correspond to ones and zeros.

In accordance with our invention, a compensator lens 48 is imposed in the path of the collimated light beam between the objective lens 34 and the galvano-mirror 32. As will be explained in greater detail hereafter, the compensator lens 48 is utilized to correct wavefront aberrations introduced by focusing the light beam corrected for a 0.6 mm cover plate through a 1.2 mm cover plate on a different optical disk loaded into the system in lieu of the optical disk 36. The compensator lens 48 is actuated by a correction signal from a compensator driver circuit 50 connected to the system control 44. The system control 44 also commands the control signal generator 24 which drives the light source 22.

The light beam reflected from the optical disk 36 is passed through the objective lens 34, through the compensator lens 48, and back to the galvano-mirror 32. The mirror reflects the light beam through beam-splitting prism 28 via the quarter-wave plate 30. The beam splitting prism 28 reflects the beam through lens 52 to a photo-detector 54. The elements enclosed by the phantom line in FIG. 2 reside in an optical head 56. This head is moved radially across the disk for track selection as illustrated by the double arrow labeled C in FIG. 2. This movement is accomplished utilizing a linear motor 58 driven by a servo circuit 60 connected to the system control 44.

The photo-detector 54 comprises a suitable transducer, such as a photo-diode, for detecting the intensity of light in the reflected beam. The output signal from the detector 54 is sent to a signal processor 62 which generates data signals representative of the information encoded on the optical media and sends them to a host controller. The system control 44 of the optical disk drive system is also under command of the host controller.

Figure 3:
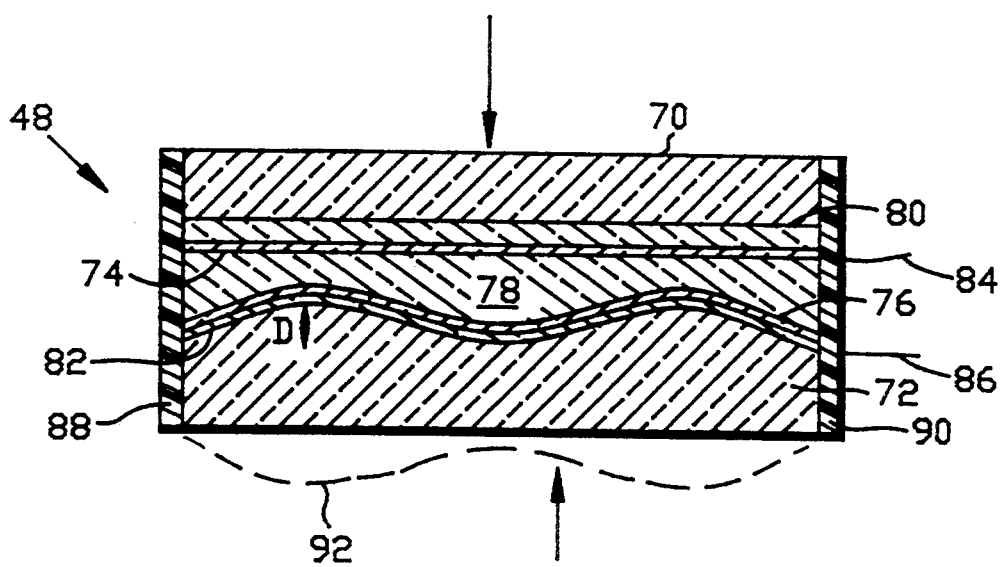
FIG. 3 illustrates a cross-section of a compensator lens that may be utilized in the preferred embodiment of our optical disk drive system. This figure is not drawn to scale.

FIG. 3 illustrates details of the compensator lens 48. Light passes through this lens in the direction of the large arrows in FIG. 3. It comprises a laminated structure including upper and lower substrates 70 and 72, upper and lower crystal allignment films 74 and 76, a layer of nematic or sematic liquid crystals 78, and upper and lower transparent electrodes 80 and 82. When energized, these electrodes align the liquid crystals in order to alter the index of refraction of the compensator lens 48. The electrodes 80 and 82 are connected to leads 84 and 86 which connect to the compensator driver 50 (FIG. 2). The side edges of the laminated structure are held together by layers of epoxy 88 and 90. The epoxy seals together the spaced apart substrates to provide a container for the liquid crystals.

The lower crystal alignment film 76, the lower electrode 82, and the lower substrate 72 are configured to give them a shape which is complementary to the wavefront aberration curve 92 illustrated in phantom lines. Specifically, these components have a cross-section which is approximately sinusoidal. This profile complements approximately three waves of aberration in the reflected wavefront measured from peak-to-valley. The refractive index of the lower substrate 72 is equal to the zero voltage state of the liquid crystals 78. Thus, with no applied voltage the alignment films 74 and 76 do not modify the wavefront. When the compensator driver 50 applies the appropriate voltage, the refractive index of the crystals changes. This change in refractive index delta n is between 0.05 and 0.30 depending upon the type of liquid crystals utilized.

The liquid crystal alignment films 74 and 76 may be made of polyvinyl alcohol and may have a thickness of, for example, ten nanometers. The upper and lower substrates 70 and 72 may be made of any high optical quality transparent plastic or glass and may have a thickness of, for example, one to five millimeters. The transparent electrodes 80 and 82 may each comprise a continuous film layer of Indium-Tin-Oxide and may have a thickness of, for example, fifty nanometers. The wavefront profile in the lower substrate 72 may be formed by press molding. The surface profile of the substrate 72 may also be achieved by ion milling or patterned thin film deposition. In the preferred embodiment, the distance illustrated by the double arrow labeled D in FIG. 3 from peak to valley equals approximately 17.7 microns. The thickness of the layer of liquid crystals 78 may be approximately twenty microns at its thickest point. The voltage level of the correction signal which must be applied by the compensator driver 50 to sufficiently alter the index of refraction depends upon the type of liquid crystal material. The inwardly facing surfaces of the alignment films 74 and 76 can have greater roughness than if they were exposed to air since the liquid crystal layer acts as an index matching liquid.

Figure 1:
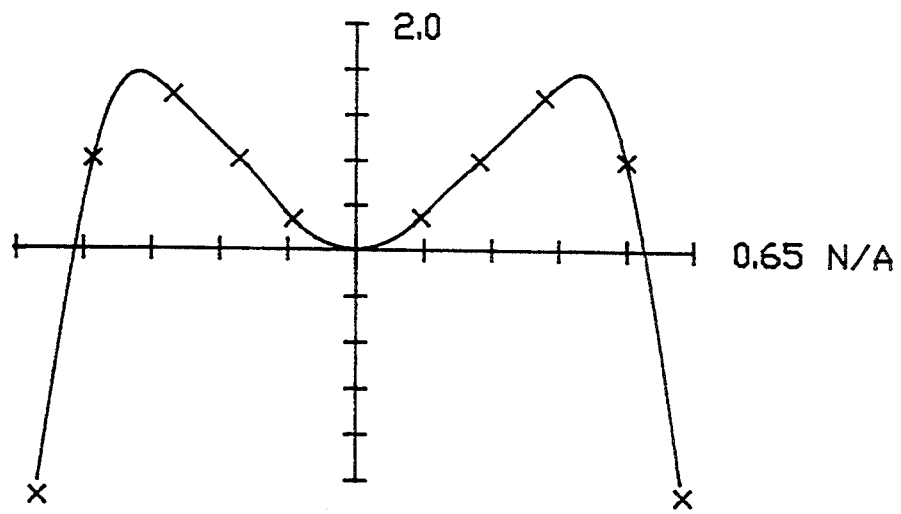
FIG. 1 is a graph illustrating the wavefront aberration in the tangential plane for a laser beam corrected for a 0.6 mm cover plate utilizing a 0.65 numerical aperture objective lens but instead reflected through a 1.2 mm cover plate.

The liquid crystal response, delta n, must be proportional to the electric field to the power of x where x does not equal one. The refractive index of nematic liquid crystals varies as the square of the electric field. If the response is linear in the electric field, the refractive index is higher for thinner sections because the electric field is stronger. If the liquid crystal layer 78 is driven to saturation this will insure the refractive index is constant across the compensator lens 48 regardless of the electric field distribution. The change in wavefront aberration from the OFF state to the ON state may be expressed as the product of delta n times S(x,y) divided by lamda, (the wavelength of the incident light). S(x,y) defines the surface profile of the lower crystal alignment film 76. S(x,y) is generally of the form $S(x,y) = a_1(x^2+Y^2) + a_2(x^2+y^2)^2 + a_3(x^2+y^2)^3$. Assuming delta n equals 0.15 and lamda equals 0.83 microns, the surface profile, S(x,y) should have the same cross-section as the generally sinusoidal curve in the graph of FIG. 1, but with a peak to valley distance of 17.7 microns.

For this particular application, the switching speed of the compensator lens is not critical. It need only turn ON when an optical disk having a thicker cover plate is inserted, and turn OFF when that disk is removed from the disk drive system. The system control 44 can turn the compensator lens 48 ON automatically or through a manual actuator key pushed by an operator when changing optical disks.

While we have described a preferred embodiment of our optical disk drive system it should be understood that modifications and adaptations thereof will occur to persons skilled in the art. For example, our invention could be utilized in a magneto-optic (MO) disk drive system. One possible location for the compensator lens in an MO system would be between the laser collimator lens and the first beam splitter. Therefore, the protection afforded our invention should only be limited in accordance with the scope of the following claims.

We claim:

1. An aberration compensation system comprising:
   a focus device for receiving a beam of light from a light source and focussing the beam of light to a focus point at a first and a second depth in a transmissive medium, the focus device focussing the beam of light to the first depth without spherical aberration;
   an aberration compensator lens in optical communication with the focus device, for receiving and passing the beam of light, the aberration compensator lens comprising a first and a second transmissive substrates, a device for maintaining the first and second substrates in spaced apart relationship, a variable index of refraction material located between the first and second substrates, a device for switching the variable index of refraction material between a first and a second index of refraction, the second substrate having a surface facing the variable index of refraction material which has a substantially sinusoidal cross-section having at least one substantially sinusoidal peak portion and at least one substantially sinusoidal valley portion, the cross-section being substantially complementary to a wavefront aberration curve caused when the beam of light is focussed to the second depth in the transmissive medium.

2. The system of claim 1, wherein the variable index of refraction material comprises a liquid crystal.

3. The system of claim 1, wherein the variable index of refraction material comprises a nematic liquid crystal.

4. The system of claim 1, wherein the variable index of refraction material comprises a sematic liquid crystal.

5. The system of claim 1, wherein the device for switching the variable index of refraction material comprises a first transparent electrode located between the first substrate and the variable index of refraction material, and a second transparent electrode located between the second substrate and the variable index of refraction material.

6. The system of claim 5, wherein the variable index of refraction material comprises a liquid crystal and further comprising a first liquid crystal alignment film located between the first electrode and the liquid crystal, and a second liquid crystal alignment film located between the second electrode and the liquid crystal.

7. The system of claim 6, wherein the first and second alignment films are comprised of polyvinyl alcohol.

8. The system of claim 1, wherein the surface of the second substrate has a cross-section having a central sinusoidal valley portion and a sinusoidal peak portion on either side of the central sinusoidal valley portion.

9. The system of claim 1, wherein the transmissive medium is an optical data storage medium.

10. The system of claim 1, wherein the means for maintaining the first and second substrates in spaced apart relationship comprises an epoxy layer.

11. An aberration compensation system comprising:
    a focus device for receiving a beam of light from a light source and focussing the beam of light to a focus point at a first and a second depth in a transmissive medium, the focus device focussing light to the first depth without spherical aberration; and
    an aberration compensator lens in optical communication with the focus lens, for receiving and passing the beam of light, the aberration compensator lens comprising a first and a second transmissive substrates, a device for maintaining the first and second substrates in a spaced apart relationship, a liquid crystal material located between the first and second substrates, the first substrate having a flat first surface facing the liquid crystal material, a first transmissive electrode overlying the first surface, a first liquid crystal alignment film overlying the first transmissive electrode, the second substrate having a second surface facing the liquid crystal material, a second transmissive electrode overlying the second surface, a second liquid crystal alignment film overlying the second transmissive electrode, the second surface having a substantially sinusoidal cross-section having at least one substantially sinusoidal peak and at least one substantially sinusoidal valley portion, the cross-section being substantially complementary to a wavefront aberration curve caused when the beam of light is focussed to the second depth in the transmissive medium.

12. The system of claim 11, wherein the liquid crystal material is comprised of a nematic liquid crystal.

13. The system of claim 11, wherein the liquid crystal material is comprised of a sematic liquid crystal.

14. The system of claim 11, wherein the first and second alignment films are comprised of polyvinyl alcohol.

15. The system of claim 11, wherein the surface of the second substrate has a cross-section having a central sinusoidal valley portion and a sinusoidal peak portion on either side of the central sinusoidal valley portion.

16. The system of claim 11, wherein the transmissive medium is an optical data storage medium.

17. The system of claim 11, wherein the device for maintaining the first and second substrates in spaced apart relationship comprises an epoxy layer.

18. The system of claim 11, wherein the liquid crystal material has a first and a second index of refraction, the first index of refraction being equal to the index of refraction of the second substrate.

19. An aberration compensation system comprising:
a light source for providing a beam of light;
a device for receiving an optical data storage medium;
a device for focussing the beam of light to a focus point at a first and a second depth in an optical data storage medium, the focus device focussing light to the first depth without spherical aberration;
an aberration compensator lens in optical communication with the focus device, for receiving and passing the beam of light, the aberration compensator lens comprising a first and a second transmissive substrates, a device for maintaining the first and second substrates in spaced apart relationship, a variable index of refraction material located between the first and second substrates, a device for switching the variable index of refraction material between a first and a second index of refraction, the second substrate having a surface facing the variable index of refraction material which has a substantially sinusoidal cross-section having at least one substantially sinusoidal peak portion and at least one substantially sinusoidal valley portion, the cross-section being substantially complementary to a wavefront aberration curve caused when the beam of light is focussed to the second depth in the optical data storage medium;
an optical reception device for receiving a light beam from the optical data storage medium and providing a data signal responsive thereto.

20. The system of claim 19, wherein the variable index of refraction material comprises a liquid crystal.

21. The system of claim 19, wherein the variable index of refraction material comprises a nematic liquid crystal.

22. The system of claim 19, wherein the variable index of refraction material comprises a semantic liquid crystal.

23. The system of claim 19, wherein the device for switching the variable index of refraction material comprises a first transparent electride located between the first substrate and the variable index of refraction material, and a second transparent electrode located between the second substrate and the variable index of refraction material.

24. The system of claim 23, wherein the variable index of refraction material comprises a liquid crystal and further comprising a first liquid crystal alignment film located between the first electrode and the liquid crystal, and a second liquid crystal alignment film located between the second electrode and the liquid crystal.

25. The system of claim 24, wherein the first and second alignment films are comprised of polyvinyl alcohol.

26. The system of claim 19, wherein the surface of the second substrate has a cross-section having a central sinusoidal valley portion and a sinusoidal peak portion on either side of the central sinusoidal valley portion.

27. The system of claim 19, wherein the means for maintaining the first and second substrates in spaced apart relationship comprises an epoxy layer.

28. An aberration compensation system comprising:
a light source for providing a beam of light;
a device for receiving an optical data storage medium;
a focus device for focussing the beam of light to a focus point at a first and a second depth in an optical data storage medium, the focus device focussing the beam of light to the first depth without spherical aberration;
an aberration compensator lens in optical communication with the focus lens, for receiving and passing the beam of light, the aberration compensator lens comprising a first and a second transmissive substrates, a device for maintaining the first and second substrates in a spaced apart relationship, a liquid crystal material located between the first and second substrates, the first substrate having a flat first surface facing the liquid crystal material, a first transmissive electrode overlying the first surface, a first liquid crystal alignment film overlying the first transmissive electrode, the second substrate having a second surface facing the liquid crystal material, a second transmissive electrode overlying the second surface, a second liquid crystal alignment film overlying the second transmissive electrode, the second surface having a substantially sinusoidal cross-section having at least one substantially sinusoidal peak and at least one substantially sinusoidal valley portion, the cross-section being substantially complementary to a wavefront aberration curve caused when the beam of light is focussed to the second depth in the optical data storage medium;
an optical reception device for receiving a light beam from the optical data storage medium and providing a data signal responsive thereto.

29. The system of claim 28, wherein the liquid crystal material is comprised of a nematic liquid crystal.

30. The system of claim 28, wherein the liquid crystal material is comprised of a semantic liquid crystal.

31. The system of claim 28, wherein the first and second alignment films are comprised of polyvinyl alcohol 32. The system of claim 28, wherein the surface of the second substrate has a cross-section having a central sinusoidal valley portion and a sinusoidal peak portion on either side of the central sinusoidal valley portion.

33. The system of claim 28, wherein the device for maintaining the first and second substrates in spaced apart relationship comprises an epoxy layer.

34. The system of claim 28, wherein the liquid crystal material has a first and a second index of refraction, the first index of refraction being equal to the index of refraction of the second substrate.

* * * * *